United States Patent [19]

Haruna et al.

[11] Patent Number: 5,041,508

[45] Date of Patent: Aug. 20, 1991

[54] ANAEROBIC COMPOSITIONS

[75] Inventors: Katsunori Haruna, Tokyo; Shuji Mochizuki, Yamanashi; Atsushi Okuma, Tokyo, all of Japan

[73] Assignee: Three Bond Co., Ltd., Tokyo, Japan

[21] Appl. No.: 631,224

[22] Filed: Dec. 21, 1990

Related U.S. Application Data

[63] Continuation of Ser. No. 293,932, Jan. 5, 1989, abandoned.

[51] Int. Cl.$^5$ ................................................ C08F 4/34

[52] U.S. Cl. ..................... 526/204; 526/206; 526/319; 526/328; 526/329; 526/329.1; 526/329.2; 526/329.3; 526/329.4; 526/329.5; 526/329.6; 526/329.7

[58] Field of Search ............................... 526/204, 206

[56] References Cited

U.S. PATENT DOCUMENTS 3,625,930 12/1971 Tobuck et al. .................. 526/206
4,569,976 2/1986 Zimmerman et al. ........... 526/204

Primary Examiner—Bernard Lipman
Attorney, Agent, or Firm—Scully, Scott, Murphy & Presser

[57] ABSTRACT

An anaerobic composition comprising a polymerizable monomer having at least one ethylenic double bond, a free radical initiator and at least one azole compound.

4 Claims, No Drawings

ANAEROBIC COMPOSITIONS

This application is a continuation of application Ser. No. 293,932, filed on Jan. 9, 1989, now abandoned.

BACKGROUND OF THE INVENTION

The present invention relates to improved anaerobic compositions.

Anaerobic compositions which remain liquid in the presence of air but polymerize (cure) upon exclusion of air, are used as adhesives and/or sealants, for example, for bonding and fixing screws and bolts, fixing fitting parts, bonding and sealing between flange surfaces, filling cavities formed in cast parts, etc.

As shown also in prior art literatures such as U.S. Pat. Nos. 2,895,950; 3,043,820; and 3,218,305, anaerobic compositions are each constituted by a combination of a free radical polymerizable (curable) monomer such as acrylate monomer and an initiator such as an organic peroxide.

Recently, in order for an anaerobic composition to adapt itself to speed-up of the production line for the manufacture of industrial products, it has been desired to develop an anaerobic composition which is extremely high in the polymerizing (curing) speed. And for increasing the polymerizing speed of anaerobic compositions there have been made attempts to use various polymerization accelerators. Examples of such accelerators include certain organic amines, sulfimides and mercaptans. These are disclosed, for example, in the foregoing U.S. Patents as well as U.S. Pat. Nos. 3,435,012; 3,425,955; 3,970,505; 4,180,640; and 4,245,077.

However, the use of such accelerators will deteriorate the storage stability of the anaerobic compositions, and it is very difficult to adjust the amount of an initiator to be added so as not to deteriorate the storage stability. Under the circumstances, an anaerobic composition capable of being employed satisfactorily in the production line, etc. has not been obtained yet.

Further, anaerobic compositions are generally inferior in curing characteristics at low temperatures, so if they are used in a cold environment, for example, in winter, their curing characteristics will be deteriorated and therefore it is necessary to warm the work site. Thus in outdoor operations, a considerable time is required for curing.

It is an object of the present invention to overcome the above-mentioned drawbacks of the prior art.

It is another object of the present invention to provide improved anaerobic compositions which are high in polymerizing (curing) speed, superior in storage stability and can retain their excellent characteristics even in a low-temperature environment, for example, in winter.

SUMMARY OF THE INVENTION

The present invention resides in an anaerobic composition comprising a polymerizable monomer having at least one ethylenic double bond, a free radical initiator and at least one azole compound.

DETAILED DESCRIPTION OF THE INVENTION

The polymerizable monomer used in the present invention is essentially not limited specially if only it exhibits anaerobic curing characteristics in combination with the polymerization initiator. It has at least one ethylenic double bond at a molecular end. Examples are unsaturated carboxylic acids such as acrylic, methacrylic, maleic, fumaric, crotonic and itaconic acids, as well as derivatives thereof. More concrete examples of the polymerizable monomer include monoesters such as methyl (meth)acrylate, ethyl (meth)acrylate, butyl (meth)-acrylate, 2-ethylhexyl (meth)acrylate, phenyl (meth)acrylate and benzyl (meth)acrylate; hydroxyalkyl esters such as 2-hydroxyethyl (meth)acrylate and 2-hydroxypropyl (meth)acrylate; polyvalent esters such as ethylene glycol diacrylate, polyethylene glycol di(meth)acrylate, neopentyl glycol di(meth)acrylate, trimethylolpropane tri(meth)acrylate and pentaerythritol tetraacrylate; (meth)acrylonitrile, (meth)acrylamide, N-substituted (meth)acrylamide; vinyl esters such as vinyl acrylate, vinyl acetate, vinyl propionate and vinyl succinate; as well as other vinyl compounds such as vinyl ethers, styrene, halogenated styrene, divinylbenzene, vinylnaphthalene, N-vinylpyrrolidone, diallyl phthalate, diallyl malate, triallyl isocyanate triallyl phosphate. These polymerizable monomers may be used alone or as a mixture of two or more. As well know, particularly preferred are acrylate or methacrylate monomers, i.e., monomers having one or more, preferably two or more, of

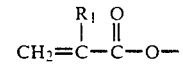

wherein R is hydrogen or methyl.

The polymerizable monomers exemplified above may contain polymerizable oligomers for the purpose of adjusting the viscosity of the anaerobic compositions or adjusting physical properties of cured products of the compositions. Examples of such polymerizable oligomers include curable resins containing malate, fumarate, allyl, or (meth)acrylate group, isocyanate-modified acryl oligomers epoxy-modified acryl oligomers, polyester acryl oligomers, and polyether acryl oligomers. These oligomers may be used alone or as a mixture of two or more.

The polymerizable monomers may further contain polymerizable unsaturated polymers such as unsaturated polyester resins or unsaturated acrylic resins. These polymerizable unsaturated polymers may be used in combination with the polymerizable monomers.

The polymerization initiator used in the present invention is not specially limited. There may be used any of the initiators which have heretofore been used in anaerobic composition. Examples are the following organic peroxides: hydroperoxides such as cumene hydroperoxide, t-butyl hydroperoxide, p-menthane hydroperoxide, methyl ethyl ketone peroxide, cyclohexane peroxide, dicumyl peroxide, and diisopropylbenzene hydroperoxide as well as ketone peroxides, diallyl peroxides, and peroxy esters. These polymerization initiators may be used alone or as a mixture of two or more. Combinations of sulfimides and mercaptans such as those disclosed in Japanese Patent Publication No. 597/1976 may also be used as they are, or in combination with the polymerization initiators exemplified above.

The polymerization initiator is used in an insufficient concentration to initiate cure of the monomer upon exclusion of oxygen. A concrete amount thereof is in the range of 0.01 to 10 parts by weight based on a total weight of 100 parts by weight of the polymerizable monomer and the polymerizable oligomer. A smaller amount thereof than 0.01 part by weight is insufficient to induce the polymerization reaction and a larger amount thereof than 10 parts by weight would deteriorate the stability of the anaerobic composition.

The polymerization accelerator used in the present invention is an azole compound which is preferably selected from the group consisting of oxazole compounds, triazole compounds, thiazole compounds and thiadiazole compounds. These preferable azole compounds have the following basic structures or isomeric structures thereof:

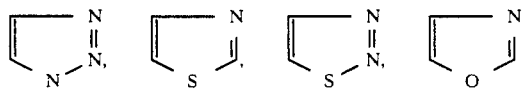

Examples of isomeric structures are:

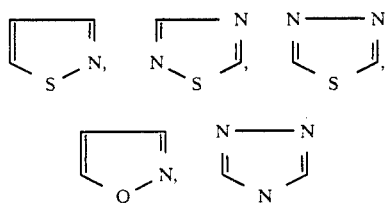

Other azole compounds such as imidazole compounds, dioxole compounds, furan compounds and furoxan compounds may be used.

There are used these azoles per se and compounds wherein one or more hydrogen atoms bonded to one or more carbon atoms on azole ring are substituted with substituent groups such as aryl, alkyl or alkenyl. Particularly preferred are compounds having azole and benzene or substituted benzene rings fused together such as benzoxazole. As examples of substituent groups to benzene ring are mentioned electron doner groups such as (lower) alkyl (e.g., $-CH_3$, $-(CH_2)_2-CH_3$), $-OCH_3$ and $-NH_2$. As examples of substituent groups to azole ring are mentioned (lower) alkyl (e.g., $-CH_3$, $-(CH_2)_2-CH_3$), halogen(e.g., $C\lambda$, Br), $-OH$, $-COOH$, $-OCOCH$, $=O$, $-NC_1=O$, $-CN$, $-SH$, $-SCH_3$, $-NH_2$, $CH_3$ and $-NO_2$.

Concrete examples of the azole compound used in the present invention are 1,2,4-triazole, oxazole, oxadiazole, thiadiazole, benzotriazole, hydroxybenzotriazole, benzothiazole, benzoxazole, 1,2,3-benzothiadiazole, 3-mercaptobenzotriazole, benzisoxazole, naphthothiazole, naphthotriazole, benzimidazole, 1,3-benzodioxole, 2,3-benzofuran, benzofuran, benzimidazole and acetnitrile.

The polymerization initiator is used in an amount sufficient to accelerate polymerization (at room temperature). Its proportion is in the range of 0.1 to 5, preferably 0.5 to 2, parts by weight based on 100 parts by weight of the composition. If its proportion is smaller than 0.1 part by weight, the polymerization accelerator will be less effective, and if it exceeds 5 parts by weight, the storage stability of the anaerobic composition will be deteriorated.

Various conventional additives may be incorporated in the compositions of present invention. For example, to ensure the storage stability, there may be added a radical absorbent such as benzoquinone, hydroquinone, or hydroquinone monomethyl ether, and a metal chelating agent such as ethylenediamine tetraacetic acid or 2-sodium salt thereof, oxalic acid, acetylacetone, or o-aminophenol.

Conventional polymerization accelerators such as sulfimides, mercaptans and amines may also be further added.

Where required, moreover, there may be used a thickening agent, a filler, a plasticizer and a coloring agent in order to adjust the properties of anaerobic resins and of cured products thereof.

The present invention will be described below in terms of working examples, which however are not intended to restrict the present invention.

EXAMPLE 1

|  | Part by weight |
|---|---|
| 2-Hydroxy-1-phenoxyethyl acrylate | 20 |
| Isobornyl methacrylate | 20 |
| Urethane acrylate (GMN-U, a product of Kyoei-sha Yushi Kogyo K.K.) | 40 |
| 2-Hydroxyethyl methacrylate | 20 |
| Ethylenediamine tetraacetic acid 2Na | 0.02 |
| Cumene hydroperoxide | 0.5 |
| n-Dodecylmercaptan | 0.2 |

To a mixture consisting of the above ingredients in the above proportions was added the azole compound shown in the item of Example 1 in Table 1, whose amount was as shown in the same table, to prepare an anaerobic composition. Then, using this anaerobic composition, setting time was measured in the following manner. The results of the measurement are as set forth in Table 2.

[Measurement of Setting Time]

Using eleven sets of bolts (diameter: 10 mm, pitch: 1.5 mm, JIS Class 2) and nuts, the composition obtained in Example 1 was applied to part of the threaded portion of each bolts, then a nut was threadedly engaged therewith, and the time (setting time) taken until the nut was no longer turned manually, was measured. The measurement temperature was 25° C. The setting time will hereinafter be also referred to as "Fe/Fe setting time at 25° C.".

COMPARATIVE EXAMPLES 1-4

Anaerobic compositions were prepared in the same manner as in Example 1 except that the polymerization accelerators shown in the item of Comparative Example in Table 1 were used in the amount shown in the same table. Then, the setting time was measured in the same way as in Example 1, the results of which are as set forth in Table 2.

TABLE 1

|  | Polymerization Accelerator | Amount (part by weight) |
|---|---|---|
| Ex. 1 | benzotriazole | 1.0 |
| Com. Ex. 1 | Not added | — |
| Com. Ex. 2 | orthobenzoic sulfimide | 1.0 |
| Com. Ex. 3 | 1,2,3,4-tetrahydroquinoline | 1.0 |
| Com. Ex. 4 | triethyl amine | 1.0 |

TABLE 2

|  | Fe/Fe Setting Time at 25° C. |
|---|---|
| Ex. 1 | 90 sec. |
| Com. Ex. 1 | over 24 hrs. |
| Com. Ex. 2 | 120 sec. |
| Com. Ex. 3 | 5 min. |

TABLE 2-continued

| | Fe/Fe Setting Time at 25° C. |
|---|---|
| Com. Ex. 4 | over 6 hrs. |

EXAMPLES 2-12

| | Part by weight |
|---|---|
| 2-Hydroxy-1-phenoxyethyl acrylate | 20 |
| Isobornyl methacrylate | 20 |
| Urethane acrylate (GMN-U, a product of Kyoei-sha Yushi Kogyo K.K.) | 40 |
| 2-Hydroxyethyl methacrylate | 20 |
| Ethylenediamine tetraacetic acid 2Na | 0.02 |
| Orthobenzoic sulfimide | 1.0 |
| Cumene hydroperoxide | 0.5 |
| n-Dodecylmercaptan | 0.2 |

The azole compounds shown as polymerization accelerators in the item of Example in table 3 were each added in the respective proportions shown in the same table to a mixture consisting of the above ingredients in the above proportions to prepare anaerobic compositions as compositions of Examples 2-12. Then, using these compositions, the setting time was measured in the same way as in Example 1 and a storage stability test was conducted as follows, the results of which are as set forth in Table 4.

[Storage Stability Test]

The anaerobic compositions were each placed 70 ml in a 100-ml container made of polyethylene, then in a constant temperature bath held at 80° C., the polyethylene container containing the anaerobic composition was put into a JIS-K-3503 test tube (15φ) up to a liquid depth of 50 mm, and the gelling time was measured.

TABLE 3

| | Polymerization Accelerator | Amount (part by weight) |
|---|---|---|
| Ex. 2 | benzotriazole | 1.0 |
| 3 | benzothiazole | 1.0 |
| 4 | hydroxybenzotriazole | 1.0 |
| 5 | 1,2,4-triazole | 1.0 |
| 6 | benzoxazole | 1.0 |
| 7 | benzotriazole | 0.1 |
| 8 | benzotriazole | 0.5 |
| 9 | benzotriazole | 2.0 |
| 10 | benzotriazole | 5.0 |
| 11 | 1,2,3,4-tetrahydroquinoline benzoxazole | 1.0 1.0 |
| 12 | 1-benzyl-2-methyl-imidazole benzothiazole | 1.0 1.0 |

TABLE 4

| | Fe/Fe Setting Time at 25° C. (sec.) | Storage Stability (hr.) |
|---|---|---|
| Ex. 2 | 60 | over 2 |
| 3 | 40 | over 2 |
| 4 | 60 | over 2 |
| 5 | 100 | over 2 |
| 6 | 80 | over 2 |
| 7 | 80 | over 2 |
| 8 | 60 | over 2 |
| 9 | 60 | over 2 |
| 10 | 60 | 1 |
| 11 | 80 | over 2 |
| 12 | 40 | over 2 |

EXAMPLE 13

| | Part by weight |
|---|---|
| Bisphenol A type methacrylate | 70 |
| 2-Hydroxyethyl methacrylate | 30 |
| Orthobenzoic sulfimide | 1.0 |
| Cumene hydroperoxide | 0.5 |
| Ethylenediamine tetraacetic acid 2Na | 0.02 |
| 1,2,3,4-Tetrahydroquinoline | 0.5 |

1.0 part by weight of benzotriazole as a polymerization accelerator was added to a mixture consisting of the above ingredients in the above proportions, then the resultant anaerobic composition, as sample A, was applied to the threadedly engaged portions of five sets of bolts and nuts (samples 1-5), and a setting speed test was conducted at room temperature (25° C.) and also at a low temperature (5° C.).

The setting speed test was made as follows. Using iron and zinc chromate bolts having the size described in Example 1 (diameter: 10 mm, pitch: 1.5 mm) and iron nuts, the sample A was applied to part of the threaded portion of each bolt, then a nut was threadedly engaged therewith. Further, the five sets of bolts and nuts with sample A applied thereto were measured for breaking torque (unit: kg f.cm) after the lapse of time stepwise from the time when the threaded engagement was made, as shown in Table 5, according to JAI 6-1979. The results of the measurement are as set out in Table 5. The measured values shown in Table 5 are mean values with respect to three samples exclusive of maximum and minimum values on the five samples

COMPARATIVE EXAMPLE 5

An anaerobic composition was prepared in the same way as in Example 13 except that benzotriazole as a polymerization accelerator was not added. This composition, as sample B, was applied to the threadedly engaged portions of five sets of bolts and nuts in the same manner as in Example 13, then the setting speed test was conducted for each set of bolt and nut at room temperature (25° C.) and also at a low temperature (5° C.) in the same manner as in Example 13. The respective breaking torques were measured, the results of which are as set out in Table 5. The measured values shown in Table 5 are mean values as noted above.

TABLE 5

| Temp. | Material Bolt/Nut | Sample | 10 min | 20 min | 30 min | 60 min | 120 min | 24 hr |
|---|---|---|---|---|---|---|---|---|
| 5° C. | Fe/Fe | A | 193 | 232 | 250 | 241 | 253 | 243 |
| | | B | 0 | 5 | 15 | 30 | 120 | 250 |
| 5° C. | Zn—Cr/Fe | A | 13 | 17 | 37 | 60 | 69 | 107 |
| | | B | 0 | 0 | 0 | 0 | 1 | 130 |
| 25° C. | Fe/Fe | A | 210 | 230 | 251 | 239 | — | 245 |
| | | B | 37 | 87 | 167 | 217 | — | 258 |

In Table 5, the mark "—" indicates "unmeasured".

What is claimed is:

1. An anaerobic composition comprising a mixture of a polymerizable monomer having at least one ethylenic double bond, a free radical initiator and at least one azole compound selected from the group consisting of benzotriazole, hydroxybenzotriazole, benzothiazole, benzoxazole, benzothiadiazole and benzisoxazole, said mixture characterized by storage stability of over two hours.

2. An anaerobic composition of claim 1, wherein said polymerizable monomer comprises at least one acrylate or methacrylate.

3. An anaerobic composition of claim 1, wherein said initiator is an organic peroxide.

4. An anaerobic composition of claim 1, wherein said azole compound is present in the range of 0.1 to 5 parts by weight based on 100 parts by weight of the composition.

* * * * *